United States Patent Office 3,154,570
Patented Oct. 27, 1964

3,154,570
ESTERS OF FARNESYL ACETIC ACID
Enrico Adami, Cesare Cardani, and Bruno Cavalleri, Milan, Italy, assignors to Istituto de Angeli S.p.A., Milan, Italy, a body corporate of Italy
No Drawing. Filed May 10, 1962, Ser. No. 193,876
Claims priority, application Great Britain, May 24, 1961, 18,812/61
9 Claims. (Cl. 260—410.5)

This invention relates to novel esters of pharmacological interest.

We have found that esters of farnesyl-acetic acid possess pronounced anti-ulcer activity both in preventive and in curative applications. Thus for example the compounds show good action against experimental gastroduodenal ulcers (histamine-antihistamine ulcer in the guinea-pig; fasting ulcer in the rat; reserpine ulcer in the rat; restraint ulcer in the rat). In such experiments the compounds are effective at doses ranging within 1.25 mg. and 50 mg./kg., according to the compound and the kind of ulcer.

The anti-ulcer activity does not appear to be connected with myospasmolytic, anticolinergic, ganglioplegic or anti-histaminic effects. In regard to such effects the more active among these compounds appear to be about 10 times less effective than papaverine, or 2500 times less effective than atropine, or 1300 times less effective than diphenhydramine, or 125 times less effective than exametonium. They possess no analgesic action in the rat (hot plate test) and do not influence the gastric secretion in rats. The new compounds do not appear to act only topically on the ulcer, since they act equally well by both the oral and the perenteral routes.

The new compounds possess furthermore a markedly favourable therapeutic ratio of anti-ulcer activity to toxicity ($LD_{50}$ i.p. >2 g./kg. in mice). Evidence suggests that these esters have a protective and restoring activity on mucous membranes and epithelia. Clinical trials on human beings indicate that these compounds are active against gastric ulcer, duodenal ulcer and other diseases in which the mucosa of the gastro-intestinal tract (such as gastritis, colitis, etc.) is affected.

The new compounds may be represented by the general formula $$A.CH_2\text{—}COOR \qquad \qquad I$$

(in which A represents the farnesyl group $(CH_3)_2C:CH.CH_2.CH_2.C(CH_3):$
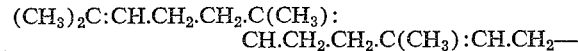
$CH.CH_2.CH_2.C(CH_3):CH.CH_2\text{—}$ and R represents an organic group).

The group R may be, for example an alkyl, alkenyl, alkynyl, cycloalkyl, aryl, aralkyl, aralkenyl or heterocyclic group. Alkyl groups are preferably methyl, ethyl, propyl, butyl, n or iso-amyl, 3,7-dimethyl-octyl, 3,7,11-trimethyl-dodecyl, n-dodecyl, lauryl groups etc. and alkenyl groups, which may possess more than one double bond, include, for example, allyl, geranyl, phytyl and farnesyl groups. Alkynyl groups may be, for example, propargyl or alkyl substituted propargyl groups. Cycloalkyl groups include, for example, cyclohexyl and methyl-cyclohexyl groups. Aryl groups include, for example, phenyl, tolyl, carvacryl groups etc. and aralkyl and aralkenyl groups may be, for example, benzyl, cinnamyl or styryl groups. The heterocyclic groups include, for example, furfuryl groups.

Particularly preferred compounds according to the invention, by virtue of their valuable anti-ulcer activity, are ethyl farnesyl-acetate, n-butyl farnesyl-acetate, cyclo-hexyl farnesyl acetate, allyl farnesyl-acetate, geranyl farnesyl-acetate, farnesyl farnesyl-acetate, phytyl farnesyl-acetate, carvacryl farnesyl acetate, cinnamyl farnesyl-acetate and propargyl farnesyl-acetate.

The new compounds may be formulated for administration according to the invention in conjunction with suitable pharmaceutical carriers or excipients. For parenteral administration, the compounds can be formulated in liquid form e.g. with sterile water, saline, an injectable oil e.g. arachis oil, or an alcohol or glycol ester of a fatty acid if desired with additives such as aluminium stearate or emulsifying or suspending agents. For oral administration, the compounds may be presented in the form of tablets, capsules, cachets, syrups, elixirs and the like, using conventional adjuvants e.g. tabletting excipients or in the case of liquid preparations, flavouring, preserving, sweetening and/or other agents. For topical administration, the carrier may comprise, for example, fatty hydrophilic excipients. For rectal administration, the carrier may be a suppository base, e.g. cocoa butter or a glyceride.

The compounds are preferably presented in the form of dosage units, each dosage unit being adapted to supply a single dose of active ingredient, and preferably containing between 10 and 100 mg. of a compound according to the invention.

The preferred forms of dosage units according to the invention are tablets, capsules, suppositories and vials of injectable solution.

The compounds according to the invention may be prepared by various ester forming reactions, for example by any of the following methods which constitute further features of the invention:

(1) Reaction of a compound of the general formula $$A.CH_2.CO.X \qquad \qquad II$$

with a compound RY (where A and R have the meanings given above and X and Y are reactive groups which are capable of reacting together with the formation of a compound of the general formula $A.CH_2.COOR$).

It will be seen that the above reaction may be carried using different pairs of reagents, for example, (a) the acid $A.CH_2\text{—}COOH$ and a compound ROH; (b) a symmetrical or mixed anhydride derived from the acid $A.CH_2\text{—}COOH$ and a compound ROH; (c) the acid $A.CH_2\text{—}COOH$ and a diazoaliphatic compound $Q.N_2$, where Q is an alkylidene group; (d) the acid halide $A.CH_2CO\text{—}Hal$ and a compound R.OH: (e) a salt of the acid $A.CH_2\text{—}COOH$ and a reactive derivative of the compound ROH e.g. a halide, sulphonate or sulphate and (f) transesterification of an ester of the acid $A.CH_2\text{—}COOH$ with a compound R.OH.

The different reactions are discussed in detail under headings (a)–(f) below.

(a) Reaction of farnesyl acetic acid (i.e. X=OH) with compounds ROH (i.e. Y=OH), where R has the above meanings, preferably in the presence of an esterification catalyst e.g. an acid such as sulphuric, hydrochloric or p-toluene-sulphonic acid or a Lewis acid such as boron trifluoride or zinc chloride. The reaction is preferably effected in an inert solvent which advantageously is a liquid such as, for example, benzene, toluene, xylene or nitrobenzene, which forms an azeotrope with water and assists in removal of the water formed in the reaction.

(b) Reaction of symmetrical farnesyl acetic anhydride (X is an acyloxy group, A.CO.O, A=farnesyl) or of mixed anhydrides of farnesyl acetic acid (X=R'.CO.O, R' is an organic group) with compounds ROH (i.e. Y=OH), where R has the above meaning. The reaction may, if desired, be carried out in the presence of an inert solvent such as a hydrocarbon or chlorinated hydrocarbon solvent, e.g. benzene, toluene, carbon tetrachloride, tetrachloroethane, etc., or an ether e.g. diethyl ether, tetrahydrofuran, etc. Catalysts may also be present e.g. acids such as sulphuric or hydrochloric acid, Lewis acids such as boron trifluoride or zinc chloride, inorganic basic substances such as sodium acetate or tertiary organic bases such as pyridine.

(c) Reaction of a diazoaliphatic compound of the general formula $Q.N_2$, such as a diazoalkane, e.g. diazomethane, with farnesyl acetic acid, preferably in the presence of an inert solvent such as an ether e.g. diethyl ether or tetrahydrofuran. Here, X is a hydroxyl group, Y is a diazo group and Q is an alkylidene group.

(d) Reaction of an acid halide, preferably the chloride, of farnesyl acetic acid with a compound R—OH where R has the above meaning, preferably in the presence of an acid-binding agent such as a tertiary organic base, e.g. a tertiary amine base such as triethylamine or dimethyl aniline or a heterocyclic base such as pyridine or quinoline or an inorganic basic substance such as an alkali metal or alkaline earth metal carbonate, bicarbonate, hydroxide e.g. sodium bicarbonate, potassium carbonate or calcium hydroxide. The reaction may be carried out if desired in the presence of an inert solvent, for example of the kind given in (b) above. It is also often possible to use an excess of the compound ROH or of the organic base as a solvent when these are liquid at ambient or slightly elevated temperature. In this reaction, X is halogen and Y is hydroxyl group.

(e) Reaction of halides, sulphates or sulphonates derived from the compound ROH with salts of farnesyl acetic acid e.g. alkali metal or silver salts, preferably in the presence of tertiary organic bases such as triethylamine, dimethylamine, pyridine or quinoline. The reaction is preferably carried out in solution or suspension in an inert solvent such as a hydrocarbon solvent e.g. benzene, toluene, hexane, etc., an ether e.g. diethyl-ether, dioxan, etc., or an ester e.g. diethyl carbonate. In this reaction, the compound RY is a halide, sulphate or sulphonate derived from the compound R.OH and X is a group OM, M being, for example, an alkali metal or silver atom.

(f) Transesterification of other esters of farnesyl acetic acid by reaction with compounds ROH, where R has the above meaning, ROH being advantageously in excess. A catalyst is preferably present, preferably a strong acid such as sulphuric or hydrochloric acid or p-toluene-sulphonic acid or a base e.g. an alkali metal alkoxide, etc. In this reaction, X is a group OR″ (where R″ is an organic group which is different from the group R of the compound R.OH and Y is a hydroxyl group).

(2) Partial hydrolysis of a farnesyl malonic acid di-ester, for example the diethyl ester, of the formula $A.CH.(COOR)_2$ e.g. with an alkali metal hydroxide in alcohol, to yield the corresponding farnesyl malonic acid monoester of the formula $A.CH.(COOH).COOR$ which is decarboxylated e.g. by heating in the dry state or in an inert solvent of adequately high boiling point.

(3) Hydrolysis of an ester of farnesyl aceto-acetic acid of the formula $CH_3CO.CH(A)COOR$ e.g. with an appropriate alkali metal alcoholate in solution in the same alcohol.

In order that the invention may be well understood we give the following examples by way of illustration only:

EXAMPLE 1

*Preparation of Methyl Farnesyl-Acetate From Farnesyl-Acetic Acid and Diazomethane*

To a solution of 5 g. of farnesyl-acetic acid in 20 cc. of ether, an ethereal solution of diazomethane is slowly added, until the yellow colour of diazomethane persists for 15–20 minutes. (About 1 g. of $CH_2N_2$ is needed.) The excess of diazo-methane is removed with a trace of acetic acid and the etheral solution is washed twice with a 10% solution of $Na_2CO_3$, and then with water until any alkaline reaction had disappeared.

The ethereal solution is dried over $MgSO_4$, the solvent is removed, and the residue is distilled off to yield 4.2 g. of the desired product.

The methyl farnesyl-acetate appears as a colourless liquid, boiling at 108–110° C. at 0.08 mm. Hg.

EXAMPLE 2

*Preparation of Geranyl Farnesylacetate From Farnesyl-Acetic Acid and Geraniol*

24.5 g. of farnesylacetic acid, 42.9 g. of geraniol and 40 ml. of xylene are refluxed during 8 hours. The water formed is removed azeotropically by means of a Markuson apparatus. After eight hours, when no more water comes off, the xylene is distilled off and the residue is cooled and dissolved in ether. The ethereal solution is washed with 10% $Na_2CO_3$ and water, and finally dried over $MgSO_4$. After removal of the ether, the residue is distilled under reduced pressure, the fraction passing at 165–170° C. and 0.05 mm. Hg being collected. Yield: 24.9 g. of the desired product.

EXAMPLE 3

*Preparation of Lauryl Farnesyl-Acetate From Farnesyl-Acetic Acid and Lauryl-Alcohol*

8 g. of farnesyl-acetic acid are refluxed with 8.3 g. of lauryl alcohol containing 3% HCl, for 4 hours. The alcohol is slowly distilled off, and its last traces are removed under vacuum. The residue is dissolved in ether and the ethereal solution is successively washed with water, with 10% $Na_2CO_3$, with water again, and finally dried over $MgSO_4$. After removal of the ether, the residue is distilled under vacuum.

The fraction passing at 193–7° C. 0.06 mm. Hg is collected to yield 8.5 g. of a colourless liquid.

EXAMPLE 4

*Preparation of n-Butyl Farnesyl-Acetate From Farnesyl-Acetic Acid and n-Butanol*

A mixture of 8 g. of farnesyl-acetic acid, 5 ml. of n-butanol, and 0.1 g. of p-toluene-sulphonic acid is refluxed for 4 hours, the alcohol is slowly distilled off and its last traces removed under vacuum. The residue is dissolved in ether and the ethereal solution is washed with water, with 10% $Na_2CO_3$, and again with water.

The ethereal solution is dried over $MgSO_4$, the ether is removed, and the residue is distilled under vacuum; the fraction passing at 127–130° C./0.1 mm. Hg is collected; this amounts to 8.1 g.

EXAMPLE 5

*Preparation of Allyl Farnesyl-Acetate From Farnesyl-Acetic Acid and Allyl Alcohol*

To a mixture of 10 g. of farnesyl-acetic acid and 5 ml. of allyl alcohol, 3.52 g. of a solution of 45% $BF_3$ in diethyl ether are added with cooling. The mixture is refluxed for 2 hours. The alcohol is distilled off in vacuo. The residue is dissolved in ether and the ethereal solution is washed with water, with 10% $Na_2CO_3$, and with water again.

The ethereal solution is dried over $MgSO_4$, the ether removed and the residue is distilled under vacuum; the fraction passing at 116–118° C./0.15 mm. Hg is collected. Yield: 8.6 g. of the desired product.

EXAMPLE 6

*Preparation of Geranyl Farnesyl-Acetate From Anhydrides*

(I) 2.9 g. of ketene are passed into 15 g. of farnesyl-acetic acid. The flask is surrounded by ice. After the ketene is added, the low-boiling fraction is distilled. 16.6 g. of geraniol is added to the residue and the mixture is refluxed for 11 hours.

The reaction mixture is diluted with ether, washed with 10% $Na_2CO_3$, and then with water until the latter is neutral to phenolphthalein and finally dried over $MgSO_4$. The ether is removed and the residue is fractionated in vacuo. The first fraction of the distillate contains the unreacted geraniol.

11.5 g. of geranyl farnesyl-acetate are collected in the range 165–168° C. at 0.05 mm. of Hg.

(II) 3 g. of acetyl chloride are slowly added to a solution of 3 g. of dry pyridine in 10 cc. of dry benzene. 10 g. of farnesyl acetic acid in 10 cc. of dry benzene are added under reflux during half an hour, and the mixture is refluxed for a further three hours. After cooling, the pyridine hydrochloride is filtered off, the solvent removed by distillation and the residue heated at 150° C. (bath temperature), under reduced pressure, for four hours: 9.9 g. of crude anhydride are then obtained. The crude anhydride is heated for 8 hours at 160° C. (bath temperature) with 5.15 g. of geraniol. After cooling, the mass is dissolved in ether and the ethereal solution is washed with 10% $Na_2CO_3$, with water and finally dried over $MgSO_4$.

After removal of the ether, the residue is distilled under reduced pressure, the fraction passing at 165–170° C. and 0.05 mm. Hg being collected.

Yield: 6.3 g. of the desired product.

EXAMPLE 7

(a) Preparation of Silver Farnesyl-Acetate

To a solution of 10 g. of farnesyl-acetic acid in 200 ml. of $NH_4OH$ 0.5 N, a solution of 12.8 g. of $AgNO_3$ dissolved in 480 cc. of distillated water, is added with stirring. A white precipitate is obtained which is filtered and washed with water and successively with acetone. The product is dried in vacuo at room temperature over $P_2O_5$. Yield: 13.5 g. of silver salt.

(b) Preparation of Ethyl Farnesyl-Acetate From Silver Farnesyl Acetate and Ethyl Iodide To a solution of 5 g. of silver farnesyl-acetate in 200 ml. of anhydrous benzene, 2.13 g. of ethyl iodide are added with stirring, in about five minutes. The mixture is refluxed for 9 hours, cooled and filtered off: the benzene solution is washed with water and successively with 10% $Na_2CO_3$, then with water again until the latter is neutral to phenolphthalein. The benzene solution is dried over $MgSO_4$, evaporated and the residue is distilled under reduced pressure. The ethyl farnesyl-acetate passes at 114–115° C. 0.06 mm. of Hg.

EXAMPLE 8

(a) Preparation of Farnesyl-Acetyl Chloride

To a solution of 19.3 g. of farnesyl-acetic acid in 100 ml. of anhydrous benzene, 11.5 g. of thionyl chloride in 10 ml. of anhydrous benzene are added dropwise over 40 minutes, with cooling to 5° to 10° C. The reaction mixture is stirred at room temperature for 2 hours, and is allowed to stand overnight. The benzene and excess $SOCl_2$ are then removed on a water bath in vacuo, and the residue is distilled in vacuo.

The farnesyl-acetyl chloride distills at 145°–155° C. at 0.7–1 mm. Hg. Yield is almost quantitative.

(b) Preparation of 3,7-Dimethyl-Octyl Farnesyl-Acetate From Farnesyl-Acetyl Chloride To a mixture of 5.84 g. of 3,7-dimethyl-octanol-(1) and 4.46 g. of dimethyl-aniline in 20 ml. of anhydrous benzene, 7 g. of farnesyl-acetyl chloride are added dropwise; the time of addition is about 15 minutes.

The mixture is refluxed for 8 hours, cooled and diluted with 20 ml. of benzene. The benzene solution is washed with 10% HCl, 10% $Na_2CO_3$ and then water again until the latter is neutral to phenolphthalein. After drying, the solvent is removed, and the residue is distilled under reduced pressure, collecting first the unreacted 3,7-dimethyl-octanol-(1) and then the desired 3,7-dimethyl-octyl-farnesyl-acetate. The 3,7-dimethyl-octyl-farnesyl-acetate passes in the range of 183–185° C. at 0.15 mm. of Hg. Yield 5.9 g.

EXAMPLE 9

Preparation of Farnesyl Farnesyl-Acetate From Farnesyl Acetyl Chloride and Farnesol To a mixture of 9.4 g. of farnesol and 3.4 g. of anhydrous pyridine in 20 ml. of anhydrous benzene, 8 g. of the chloride of farnesyl-acetic acid are added dropwise. The mixture is refluxed for 6 hours, cooled, and diluted with benzene.

The benzene solution is washed with water, 10% HCl, 10% $Na_2CO_3$, and again with water until the latter is neutral to phenolphthalein. The solvent is then removed and the residue is distilled under reduced pressure. The unchanged farnesol is recovered. The ester appears as a viscous liquid having a terpene odour. 9.1 grams are obtained, boiling at 218–221° C./0.07 mm. Hg.

EXAMPLE 10

Preparation of Iso-Amyl Farnesyl-Acetate From Ethyl Farnesyl-Acetate by Transesterification 7.55 g. of ethyl farnesyl-acetate are refluxed for 2 hours with 6.8 g. of iso-amyl-alcohol saturated with gaseous HCl. The alcohol is distilled off, the residue is dissolved in ether and the ethereal solution is washed with 10% $Na_2CO_3$, with water, and dried. The solvent is removed and the residue is distilled under reduced pressure. Yield: 6.2 g. of the desired produced. The iso-amyl farnesyl-acetate boils at 145°–149° C./0.1 mm. Hg.

EXAMPLE 11

Preparation of Ethyl Farnesyl-Acetate From Farnesyl-Malonic Acid Diethyl Ester 50 g. of diethyl farnesyl-malonate are dissolved into 50 ml. of 95% ethyl alcohol; to that solution, cooled to 5° C., a solution of alcoholic potassium hydroxide (7.62 g. KOH in 80 ml. of 95% ethanol) is added. The mixture is allowed to stand at room temperature for 30 hours, the alcohol is then removed under vacuum in a thin layer evaporator, and the residue is dissolved in water.

The alkaline solution is extracted by means of ether and 12.1 g. of diethyl farnesyl-malonate are recovered. The solution is acidified with 10% HCl using a Congo red indicator, and again extracted with ether. The ethereal layer is washed with water until chloride has disappeared and the ether is removed. The residue is heated at 150° C. at 15 mm. Hg for 4 hours, and is then dissolved in ether; the ethereal solution is washed with 10% $Na_2CO_3$ and then with water until the latter is neutral to phenolphthalein. The ethereal solution, after drying over $MgSO_4$, is evaporated to remove the ether, and the residue is distilled under vacuum, the fraction passing at 127°–130° C./0.15 mm. Hg being collected; 23.3 g. of ethyl farnesyl acetate are obtained.

A sample which was further purified by distillation had the following characteristics: B.P. 114–115° C./0.06 mm. Hg.

EXAMPLE 12

Preparation of Ethyl Farnesyl-Acetate From Ethyl Farnesyl-Acetoacetate

To a solution of 0.56 g. of sodium in 40 ml. of absolute ethanol, 8.4 g. of ethyl farnesyl-acetoacetate are added, and the mixture is refluxed for 2 hours. The alcohol is distilled off, its last traces being removed under vacuum.

The residue is dissolved in water and extracted with ether; the ethereal layer is washed with 10% $Na_2CO_3$ and dried over $MgSO_4$. After removal of the solvent, the residue is distilled and the fraction passing at 115°–120° C./0.09 mm. Hg is collected. Yield: 4.3 g.

EXAMPLE 13

Using methods described in the previous examples, the following products can be obtained. The physical properties of a number of such products are given in the following table:

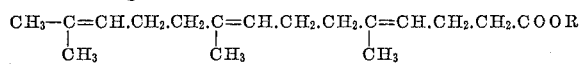

| R | B.P. (°C.) | Pressure (mm. Hg) |
|---|---|---|
| Methyl | 108–110 | 0.08 |
| Ethyl | 114–115 | 0.06 |
| Propyl | 130–135 | 0.1 |
| n-Butyl | 127–130 | 0.1 |
| Isoamyl | 145–149 | 0.1 |
| 3,7-dimethyl-octyl | 183–185 | 0.15 |
| n-Dodecyl | 193–197 | 0.06 |
| 3,7,11-trimethyl-dodecyl | 205–209 | 0.15–0.20 |
| Cyclohexyl | 156–161 | 0.1 |
| Allyl | 116–118 | 0.15 |
| Propargyl | 122–128 | 0.07 |
| Geranyl | 165–168 | 0.05 |
| Farnesyl | 218–221 | 0.07 |
| Phytyl | 226–230 | 0.08 |
| Phenyl | 162–170 | 0.15 |
| Benzyl | 162–170 | 0.25 |
| Carvacryl | 188–192 | 0.13 |
| Cinnamyl | 195–200 | 0.15 |
| Furfuryl | 152–156 | 0.15 |

EXAMPLE 14

*Pharmaceutical formulations.*—The following formulations refer to 1,000 units or 1 kg. of pharmaceutical product.

(a) TABLETS

| | | |
|---|---|---|
| Geranyl farnesylacetate | g | 50 |
| Chloroform or ether | cc | 50 |
| Aerosil (colloidal silicic acid) | g | 300 |
| Lactose | g | 50 |
| Stearic acid (powdered) | g | 5 |
| Talc | g | 10 |

The aerosil is evenly moistened with a solution of the geranyl farnesylacetate in chloroform or ether; the solvent is evaporated, and then the other ingredients are added. The mixture is compressed into tablets, each weighing 0.415 g. Each tablet contains 50 mg. of geranyl farnesylacetate.

(b) CAPSULES

G.
Geranyl farnesylacetate _____ 50
Soya lecithin _____ 20
Almond oil _____ 80

The solution, which is obtained by gently warming the ingredients is filled into capsules which are sealed. Each capsule contains 0.150 g. of mixture, equal to 50 mg. of geranyl farnesylacetate.

(c) VIALS (i)

| | | |
|---|---|---|
| Farnesyl farnesylacetate | g | 20 |
| Arachis oil, q.s. to | cc | 1000 |

The solution obtained by dissolving the active ingredients in arachis oil is filtered. 1 cc. portions are filled into vials and the vials sterilised at 120° C. for 1 hour. Each vial contains 20 mg. of farnesyl farnesylacetate.

(ii)

| | | |
|---|---|---|
| Geranyl farnesylacetate | g | 50 |
| Tetrahydrofuryl alcohol-polyethylene glycol ether, q.s. to | cc | 1000 |

Preparation as under (i) above. Each vial contains 50 bg. of geranyl farnesylacetate.

(iii)

| | | |
|---|---|---|
| Geranyl farnesylacetate | g | 100 |
| Aluminium monostearate | g | 18 |
| Arachis oil, q.s. to | cc | 1000 |

Sufficient arachis oil is added to 18 g. of aluminium stearate to make 900 cc. The mixture is stirred for 20 minutes at 40° C. then stirred again and heated to 135–140° C., the temperature rising by 2–3° per minute. The mixture is then cooled under reflux to 120° C. and finally, while stirring is interrupted, the temperature is allowed to drop to ambient. The 100 g. of geranyl farnesylacetate are dispersed into the 900 cc. of the gel. The mixture is stirred for 15 minutes and then passed to a sterile colloid mill. The substance is filled into vials of the antibiotic type. Each vial (1 cc.) of the thixotropic suspension (viscosity about 250–500 cps.) contains 100 mg. of geranyl farnesylacetate.

(d) SYRUP EMULSION (DROPS)

| | | |
|---|---|---|
| Propargyl farnesylacetate | g | 100 |
| Refined cocoa-nut oil | g | 100 |
| Sugar | g | 150 |
| Glyceryl monostearate | g | 15 |
| Sodium benzoate | g | 5 |
| Hydroxy-butyl anisole | g | 0.08 |
| Sodium ethylenediamine tetra-acetate | g | 5 |
| Triton WR 1339 | g | 2 |
| Water, q.s. to | cc | 1000 |

*Preparation.*—Two emulsions are prepared, as follows:
(i) Geranyl farnesylacetate, cocoa-nut oil, hydroxy-butyl anisole, Trison WR 1339;
(ii) Water, sugar, sodium benzoate, sodium EDTA, glyceryl monostearate.
(i) and (ii) are mixed and emulsifying is continued while lowering the temperature to 25–30° C. The mixture is homogenised by means of a homogenizer, or a colloid mill. Each cc. of syrup emulsion contains 100 mg. of propargyl farnesylacetate.

(e) OINTMENT

G.
n-Dodecyl farnesylacetate _____ 50
Wool alcohols _____ 25
Ceresine _____ 123
White vaseline _____ 50
Vaseline oil _____ 250
Water, q.s. to _____ 1000

The ingredients are heated with stirring until melted and the resulting mixture emulsified.

(f) SUPPOSITORIES

| | | |
|---|---|---|
| Geranyl farnesylacetate | g | 100 |
| Saturated fatty acid glycerides, q.s. to | kg | 2,500 |

The components are melted at 40°, and the melts poured into suitable cooled moulds.

Each suppository, weighing 2.5 g., contains 100 mg. of geranyl farnesylacetate.

We claim:
1. A compound of the formula

$(CH_3)_2C=CH-CH_2-CH_2-C(CH_3)=CH-CH_2$
$-CH_2-C(CH_3)=CH-CH_2-CH_2-COOR$ where R is selected from the group consisting of dodecyl, 3,7-dimethyl-octyl, 3,7,11-trimethyl-dodecyl, alkenyl, propargyl, alkyl-substituted propargyl, cyclohexyl, methyl-cyclohexyl, carvacryl, benzyl, styryl and cinnamyl.
2. Cyclo-hexyl farnesylacetate.
3. Allyl farnesylacetate.
4. Geranyl farnesylacetate.
5. Farnesyl farnesylacetate.
6. Phytyl farnesylacetate.
7. Carvacryl farnesylacetate.
8. Cinnamyl farnesylacetate.
9. Propargyl farnesylacetate.

References Cited in the file of this patent

Chemical Abstracts, vol. 47, 2146c (1953).
Groggins: Unit Processes in Organic Synthesis, 3rd edition, McGraw-Hill Book Co. Inc., 1947, pages 613 to 642.